US008605380B1

(12) United States Patent  (10) Patent No.: US 8,605,380 B1
Christensen et al.  (45) Date of Patent: Dec. 10, 2013

(54) TECHNIQUE FOR FIXING TAP COEFFICIENTS IN A PROGRAMMABLE FINITE-IMPULSE-RESPONSE EQUALIZER

(75) Inventors: Eric Rolf Christensen, Tucson, AZ (US); Ernest Stewart Gale, Tucson, AZ (US); Robert Allen Hutchins, Tucson, AZ (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/550,603

(22) Filed: Jul. 17, 2012

(51) Int. Cl.
    *G11B 5/035* (2006.01)
(52) U.S. Cl.
    USPC .................................................. 360/65
(58) Field of Classification Search
    None
    See application file for complete search history.

(56) References Cited

U.S. PATENT DOCUMENTS

| 6,381,085 | B1 | 4/2002 | Du et al. |
| 6,385,239 | B1 | 5/2002 | Okamoto et al. |
| 6,523,052 | B1 | 2/2003 | Staszewski |
| 7,589,927 | B2 | 9/2009 | Hutchins et al. |
| 7,663,831 | B2 | 2/2010 | Hayashi et al. |

*Primary Examiner* — Paul Huber
(74) *Attorney, Agent, or Firm* — Nelson and Nelson; Daniel P. Nelson; Alexis V. Nelson

(57) ABSTRACT

A method for selecting which tap coefficients of a programmable finite-impulse-response (FIR) equalizer to fix includes performing an initial calibration to determine an initial value for each tap coefficient of a FIR equalizer. Using these initial values, a "total" FIR equalizer is determined which sets the tap coefficients to their initial values. The method further determines multiple sets of tap coefficients that may potentially be fixed in the FIR equalizer. For each set of tap coefficients that may potentially be fixed, the method determines a "fixed" FIR equalizer that sets the tap coefficients in the set to their initial values and other tap coefficients to zero. The method then determines a phase-difference energy between the "total" FIR equalizer and the "fixed" FIR equalizer for each set of tap coefficients that may potentially be fixed. The set of tap coefficients associated with the lowest phase-difference energy are then fixed.

20 Claims, 16 Drawing Sheets

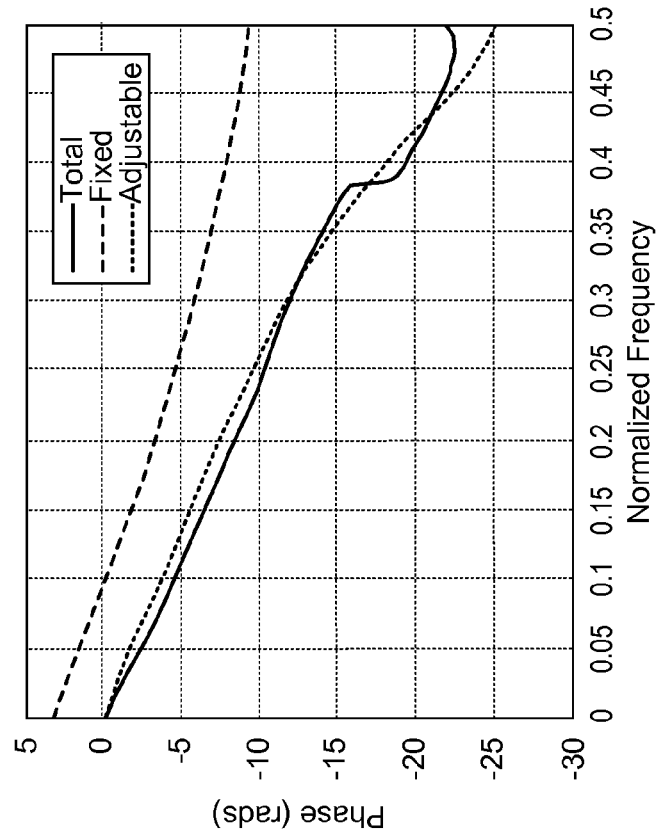
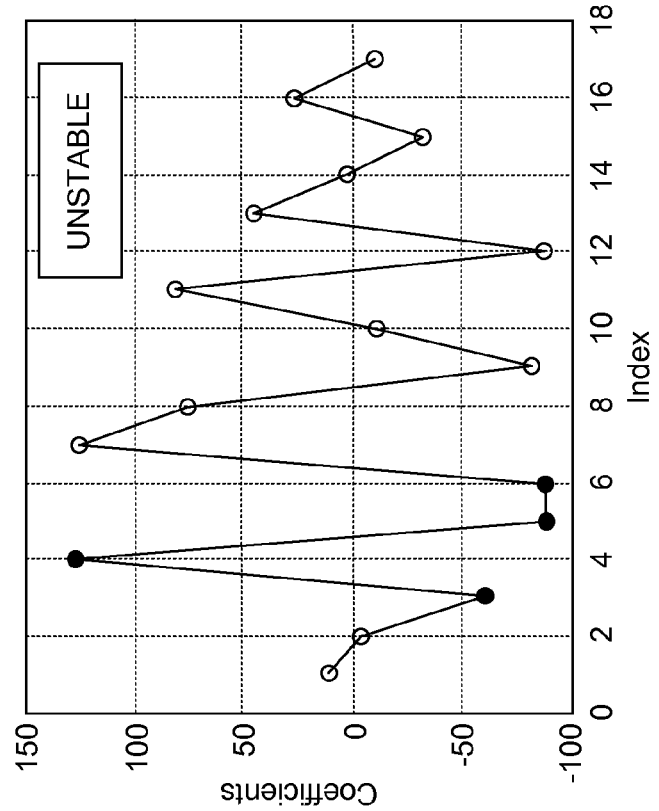
Fig. 8A
Fig. 8B

TECHNIQUE FOR FIXING TAP COEFFICIENTS IN A PROGRAMMABLE FINITE-IMPULSE-RESPONSE EQUALIZER

BACKGROUND

1. Field of the Invention

This invention relates to apparatus and methods for reading data on storage media such as magnetic tape.

2. Background of the Invention

As the storage capacities of modern tape cartridges are pushed higher and higher, it is becoming increasingly difficult to read data from magnetic tape. Small variations in manufacturing or variations in temperature, humidity, or head-to-tape interfaces can cause changes in the read-back signal which may cause traditional recording channels to fail to detect data. Modern tape drives are able to handle this variability by being adaptable. Based upon the signals read from tape, the read-detect channel of the modern tape drive can adjust the equalization of the read-back signal to improve the signal-to-noise ratio. It can also compensate for head asymmetry or modify data detection parameters to improve the detection reliability.

One of the problems with the adaptability discussed above is that sometimes the read-detect channel does not converge to an optimal configuration. Instead, it may diverge from an optimal configuration such that data can no longer be detected. With otherwise good media, head, and tape path, the channel may adapt in a manner that renders the data useless. This problem tends to get worse as the storage density of tape increases.

Divergence of the equalizer is the primary cause of read-detect channel instability. In many cases, this divergence may be controlled by fixing a certain number of tap coefficients in the adaptable finite-impulse-response (FIR) equalizer (also known as a FIR filter). For example, in a typical FIR equalizer that includes seventeen taps, four tap coefficients out of seventeen may be fixed. If the correct tap coefficients are fixed, then the FIR equalizer will be stable and the FIR equalizer will converge to an optimal configuration (assuming that the initial configuration of the FIR equalizer was reasonable). If the wrong tap coefficients are fixed, then the FIR equalizer will not converge and the equalization will eventually get so bad that the data read will not be usable.

In the FIR equalizers of many current tape drives, four adjacent tap coefficients out of seventeen are fixed. In such drives, the initial configuration (i.e., tap coefficients) of the equalizer may be determined using a calibration procedure. The largest tap coefficient of the seventeen may then be fixed. Two tap coefficients on one side of the largest tap coefficient and one tap coefficient on the other side of the largest tap coefficient may be fixed. The side with the two fixed tap coefficients is typically selected to be in the direction of the next largest tap coefficient of the seventeen coefficients. This methodology has worked well historically. However, as tape linear densities have increased and recording properties of the storage media have changed, this methodology increasingly results in divergent FIR equalizers.

In view of the foregoing, what is needed is an improved methodology to select which tap coefficients of a programmable FIR equalizer to fix. Ideally, such a methodology will allow FIR equalizers to more consistently converge to an optimal configuration that improves, rather than worsens, the signal to noise ratio.

SUMMARY

The invention has been developed in response to the present state of the art and, in particular, in response to the problems and needs in the art that have not yet been fully solved by currently available apparatus and methods. Accordingly, the invention has been developed to provide apparatus and methods for more effectively selecting which tap coefficients of a programmable finite-impulse-response (FIR) equalizer to fix. The features and advantages of the invention will become more fully apparent from the following description and appended claims, or may be learned by practice of the invention as set forth hereinafter.

Consistent with the foregoing, a method for selecting which tap coefficients of a programmable finite-impulse-response (FIR) equalizer to fix is disclosed herein. In one embodiment, such a method includes performing an initial calibration to determine an initial value for each tap coefficient of a FIR equalizer. Using these initial values, a "total" FIR equalizer is determined which sets the tap coefficients to their initial values. The method further determines multiple sets of tap coefficients that may potentially be fixed in the FIR equalizer. For each set of tap coefficients that may potentially be fixed, the method determines a "fixed" FIR equalizer that sets the tap coefficients in the set to their initial values and other tap coefficients to zero. The method then determines a phase-difference energy between the "total" FIR equalizer and the "fixed" FIR equalizer for each set of tap coefficients that may potentially be fixed. The set of tap coefficients associated with the lowest phase-difference energy are then fixed to produce a stable FIR equalizer.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 6A through 15B are used to illustrate a specific example of implementing the method of FIG. 4.

DETAILED DESCRIPTION

Figure 1:
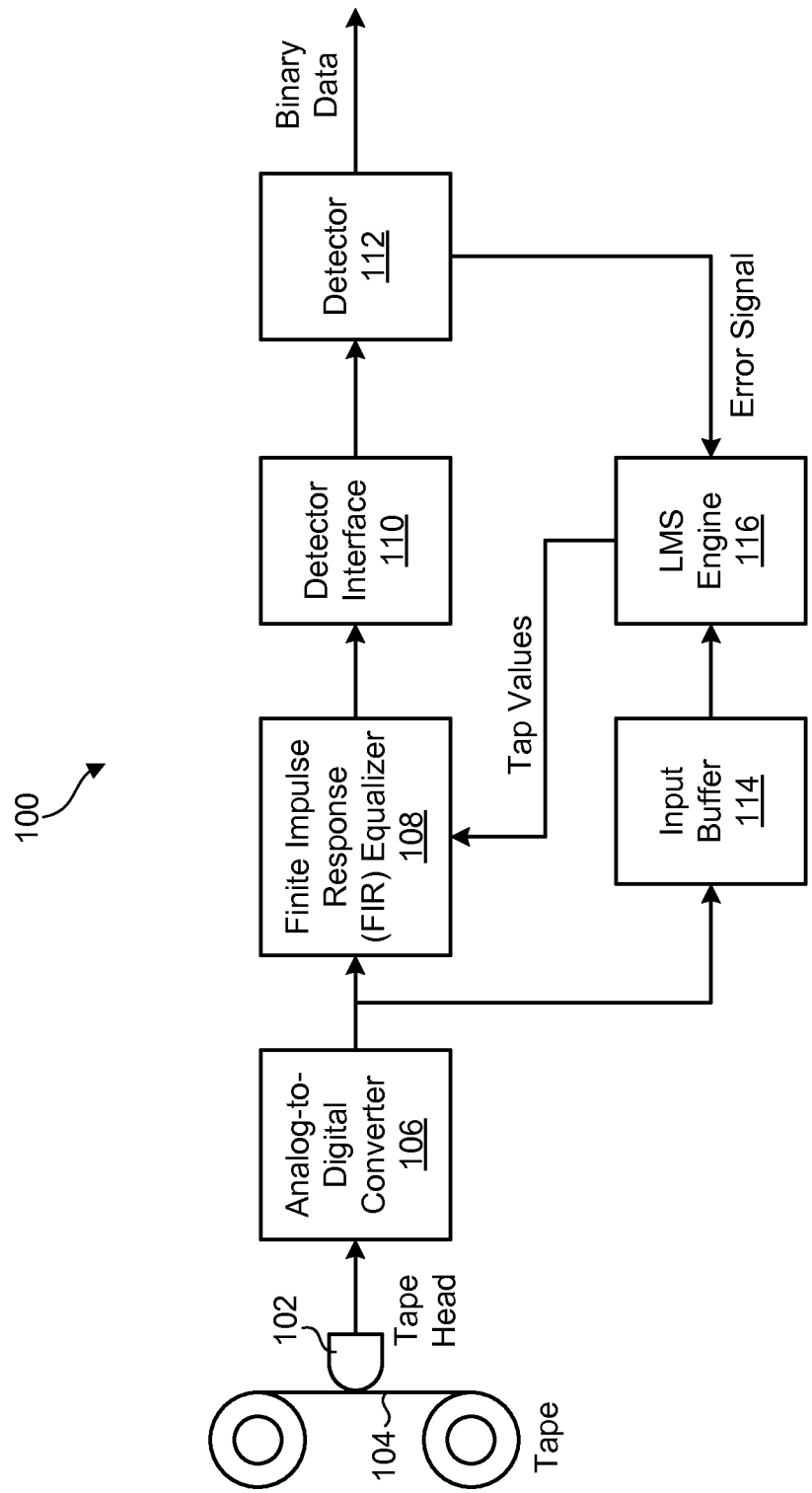
FIG. 1 is a high-level block diagram showing one example of a read-detect channel of a tape drive.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may be implemented as a hardware embodiment, a software embodiment (including firmware, resident software, microcode, etc.) configured to operate hardware, or an embodiment combining both software and hardware elements. Each of these embodiments may be represented by one or more modules or blocks. Furthermore, the present invention may be implemented in a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example, but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a high-level block diagram showing one example of a read-detect channel circuit 100 of a tape drive is illustrated. There are typically sixteen or thirty-two read detect channels 100 per tape drive, although other numbers of channels are possible. During a read operation, a tape head 102 is typically passed over data recorded on magnetic tape 104 in order to convert the recorded data into an analog signal. In particular, in a magnetic tape drive, a magneto-resistive read head 102 is passed over data that has been previously written as flux reversals on the magnetic tape 104. As the head 102 is passed over the tape 104, the head 102 converts the flux reversals into an electrical analog signal that represents the data originally stored on the magnetic tape 104.

An analog-to-digital converter 106 ("ADC") periodically samples the analog signal and converts the sampled analog signal to a digital input signal and creates a digital waveform. The output of the analog-to-digital converter 106 may then be sent to a finite-impulse-response (FIR) equalizer 108 to shape the digital waveform. The digital waveform may then be sent to a detector 112 by way of a detector interface 110. The detector 112 may convert the digital waveform to a binary stream of ones and zeros which ideally reflects the data that was originally written to the magnetic tape 104.

Upon producing the binary data, the detector 112 produces an error signal which indicates the error between the equalizer output and the desired detector input. This error signal may be sent to a least means square (LMS) engine 116 which uses the error signal to adjust selected tap coefficients of the FIR equalizer 108. An input buffer 114 may be used to temporally align the error signal with the output received from the analog-to-digital converter 106. In practice, as will be explained in more detail hereafter, certain adjacent tap coefficients of the FIR equalizer 108 may be fixed while other tap coefficients may be allowed to adapt (i.e., adjust their values to optimal values) in response to the error signal. This ideally allows the FIR equalizer 108 to remain stable while still allowing it to adapt to the error signal. Two examples of FIR equalizer circuits 108 are illustrated in FIGS. 2 and 3.

Figure 2:
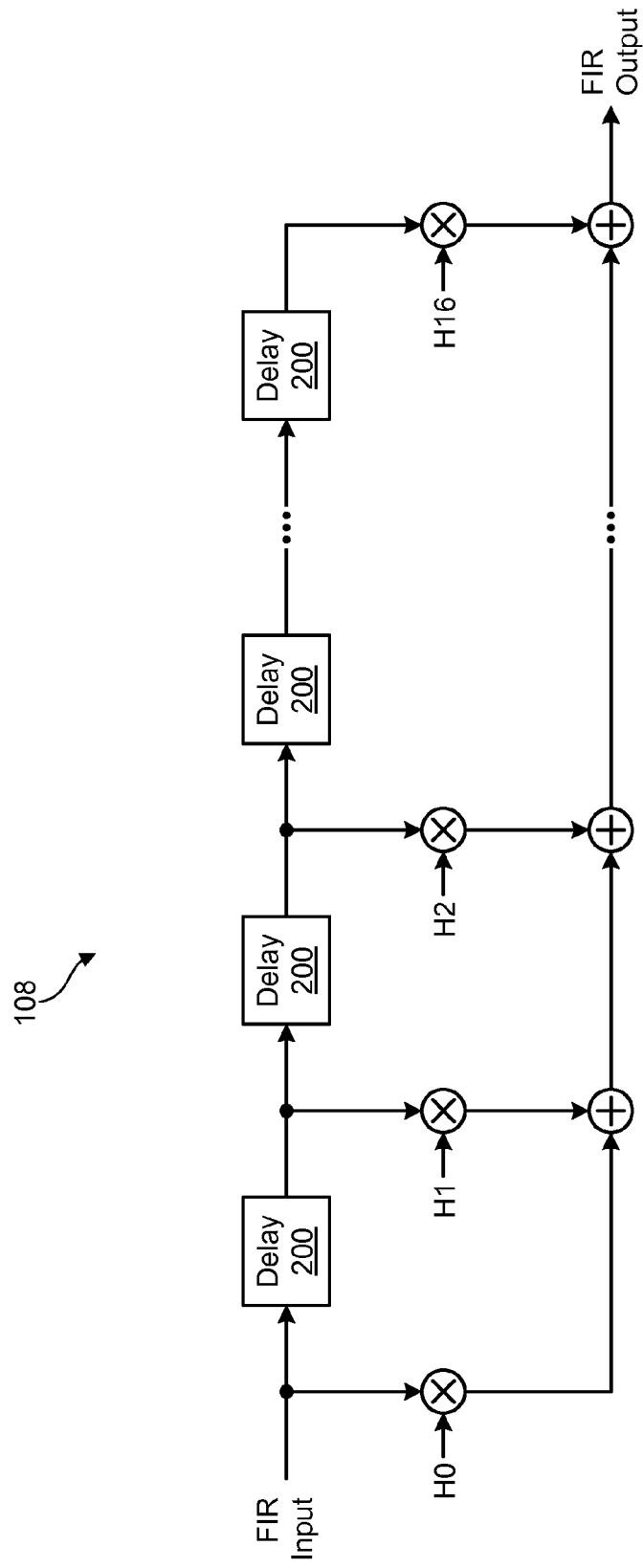
FIG. 2 is a high-level block diagram showing a conventional programmable finite-impulse-response (FIR) equalizer.
Figure 3:
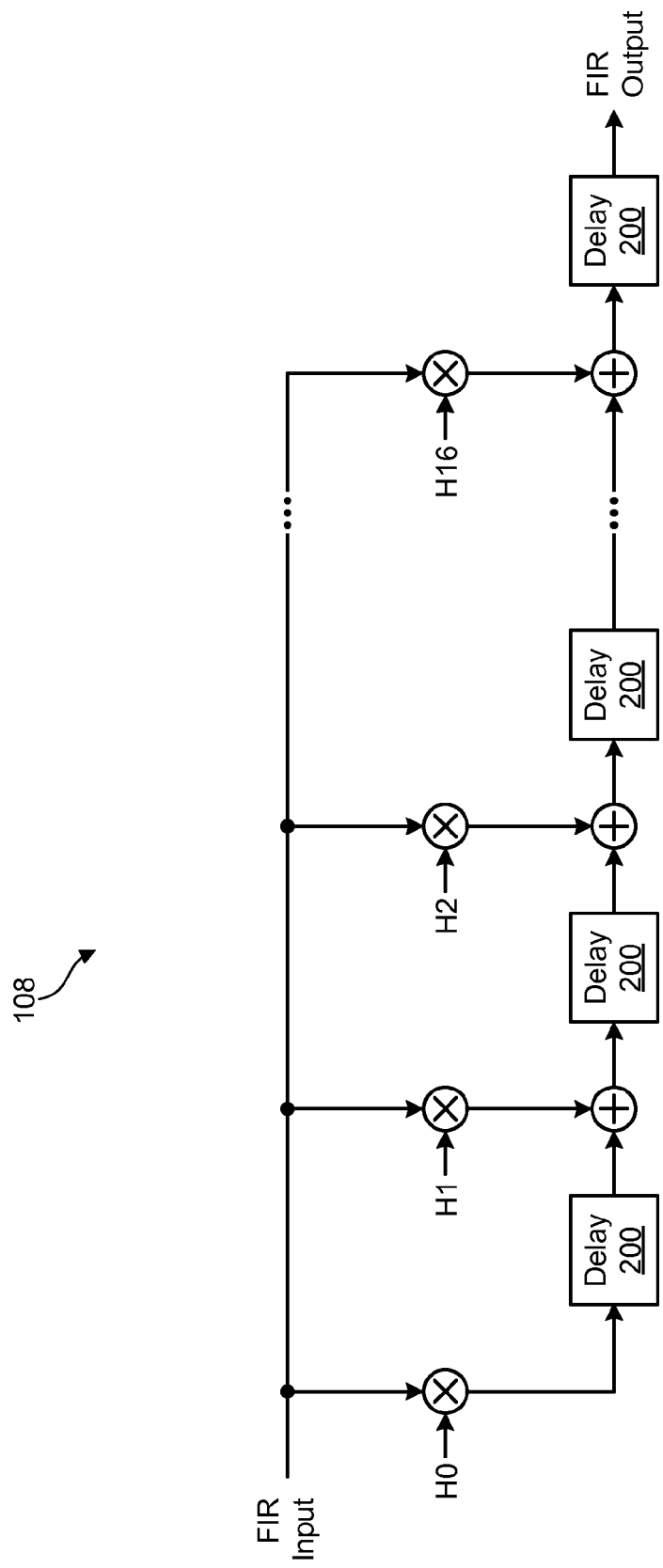
FIG. 3 is a high-level block diagram showing a programmable FIR equalizer that is functionally equivalent to the programmable FIR equalizer illustrated in FIG. 2.

Referring to FIG. 2, a high-level block diagram showing an example of a conventional programmable finite-impulse-response (FIR) equalizer 108 is illustrated. As shown, the output of the FIR equalizer 108 is generated by convolving its input signal with the FIR equalizer's impulse response. The output of the FIR equalizer 108 is a weighted sum of the current and a finite number of previous values of the input. Delay units 200 (which may be implemented using registers, for example) may output the previous values of the input. The values (H0, H1, H2, . . . , Hn) are tap coefficients that control the impulse response.

In the illustrated embodiment, the FIR equalizer 108 includes seventeen taps and associated tap coefficients. Such FIR equalizers 108 generally provide an optimal balance between cost and stability and thus are used in the read-detect channels 100 of many current tape drives. More taps may increase the cost of the FIR equalizer 108 while providing little additional benefit in terms of signal-to-noise ratio (SNR). Fewer taps may decrease the cost of the FIR equalizer 108 but undesirably reduce the SNR.

Nevertheless, the disclosed FIR equalizer 108 is not limited to seventeen taps but may include more or fewer taps as needed. Furthermore, the methodology disclosed herein is not limited to FIR equalizers 108 having seventeen taps but may be used with FIR equalizers 108 having any number of taps. A FIR equalizer 108 that is physically different from, but functionally equivalent to, the FIR equalizer 108 illustrated in FIG. 2 is shown in FIG. 3.

In order to account for changes to the read-back signal caused by variations in manufacturing, temperature, humidity, and/or the head-to-tape interface, certain tap coefficients of the FIR equalizer 108 may be allowed to vary, while other tap coefficients are fixed. Based upon the signals read from the magnetic tape 104, the read-detect channel 100 may adjust the equalization of the read-back signal by modifying the tap coefficients that are allowed to vary. One drawback of this approach is that, if the wrong tap coefficients are allowed to vary, the tap coefficients may vary in a way that actually worsens the signal-to-noise ratio instead of improving it. In some cases, the tap coefficients may vary in such a way that data on the magnetic tape 104 can no longer be detected.

Thus, an improved method is needed to correctly select which tap coefficients of a FIR equalizer 108 to fix, thereby also selecting the tap coefficients of the FIR equalizer 108 that are allowed to vary. Ideally, such a method will enable the FIR equalizer 108 to more consistently converge to an optimal configuration that improves the signal-to-noise ratio of the data being read. One embodiment of such a method will be described in association with FIG. 4. A specific example of implementing the method of FIG. 4 will be described in association with FIGS. 6A through 15B.

Figure 4:
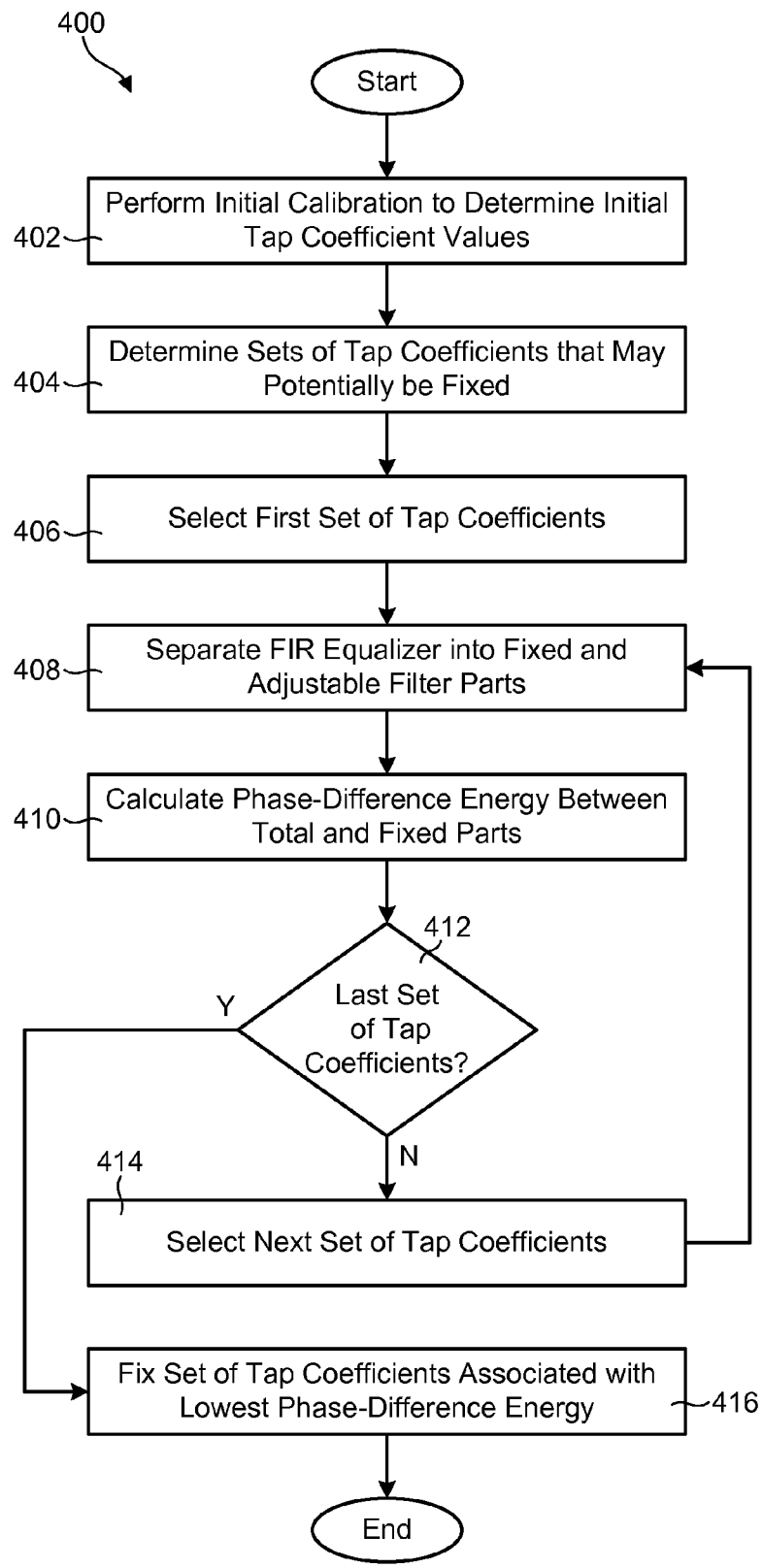
FIG. 4 is a flow chart showing an improved method for fixing tap coefficients.

Referring to FIG. 4, one embodiment of an improved method 400 for selecting which tap coefficients of a FIR equalizer 108 to fix is illustrated. As shown, the method 400 begins by performing 402 an initial calibration procedure to determine initial values for the FIR's tap coefficients. In certain embodiments, the initial calibration is performed 402 by reading calibration data on magnetic tape 104 and setting the tap coefficients to maximize the signal-to-noise ratio of the calibration data. In other embodiments, the initial calibration is performed 402 by simply setting the tap coefficients to values read from the magnetic tape 104 or another location.

Once the initial values for the tap coefficients are determined, the method 400 determines 404 multiple sets of tap coefficients that can potentially be fixed. For example, the method 400 may determine 404 that sets of four adjacent tap coefficients may potentially be fixed. If the FIR equalizer has seventeen tap coefficients, this would indicate that there are fourteen sets of four adjacent tap coefficients that may potentially be fixed. In another example, the method 400 may determine 404 that sets of three adjacent tap coefficients may potentially be fixed. If the FIR equalizer has seventeen tap coefficients, this would indicate that there are fifteen sets of three adjacent tap coefficients that may potentially be fixed. In a similar manner, the method 400 may be used with any number of adjacent tap coefficients that may potentially be fixed.

Once the method 400 has determined 404 which sets of tap coefficients may potentially be fixed, the method 400 selects 406 the first set of tap coefficients. The method 400 then separates 408 the FIR equalizer 108 into "fixed" and "adjustable" parts. The manner in which step 408 is performed will be described in more detail in association with FIG. 5. The method 400 then calculates 410 the phase-difference energy between the "total" and "fixed" FIR equalizers. What is meant by "total" and "fixed" FIR equalizers will also be explained in association with FIG. 5. In general, step 410 may include calculating the phase of the transfer function for both the "total" and "fixed" FIR equalizers and then calculating the energy in the difference between the two phase spectra. Examples of phase spectra will be illustrated in association with FIGS. 6A through 15B. In certain embodiments, the phase-difference energy between the "total" FIR equalizer and the "fixed" FIR equalizer may be calculated using the following equation:

$$\log_{10} \sum_{f_i \in \Delta f} [\phi_{total}(f_i) - \phi_{fixed}(f_i)]^2$$

where Δf is the frequency interval of interest. Other methods for calculating the phase-difference energy may also be used and are within the scope of the invention.

As shown, the method 400 then determines 412 if the set of tap coefficients that were selected at step 406 is the last set of tap coefficients. If the set is not the last set, the method 400 selects 414 the next set of tap coefficients and repeats steps 408, 410. This continues until the phase-difference energy is calculated for each set of tap coefficients. Once the phase-difference energy has been calculated for all sets of tap coefficients, the method 400 determines which set of tap coefficients had the lowest phase-difference energy and fixes 416 this set of tap coefficients. The instant inventors have found that fixing this set of tap coefficients will typically produce a FIR equalizer 108 that is stable and converges to an optimal configuration.

Figure 5:
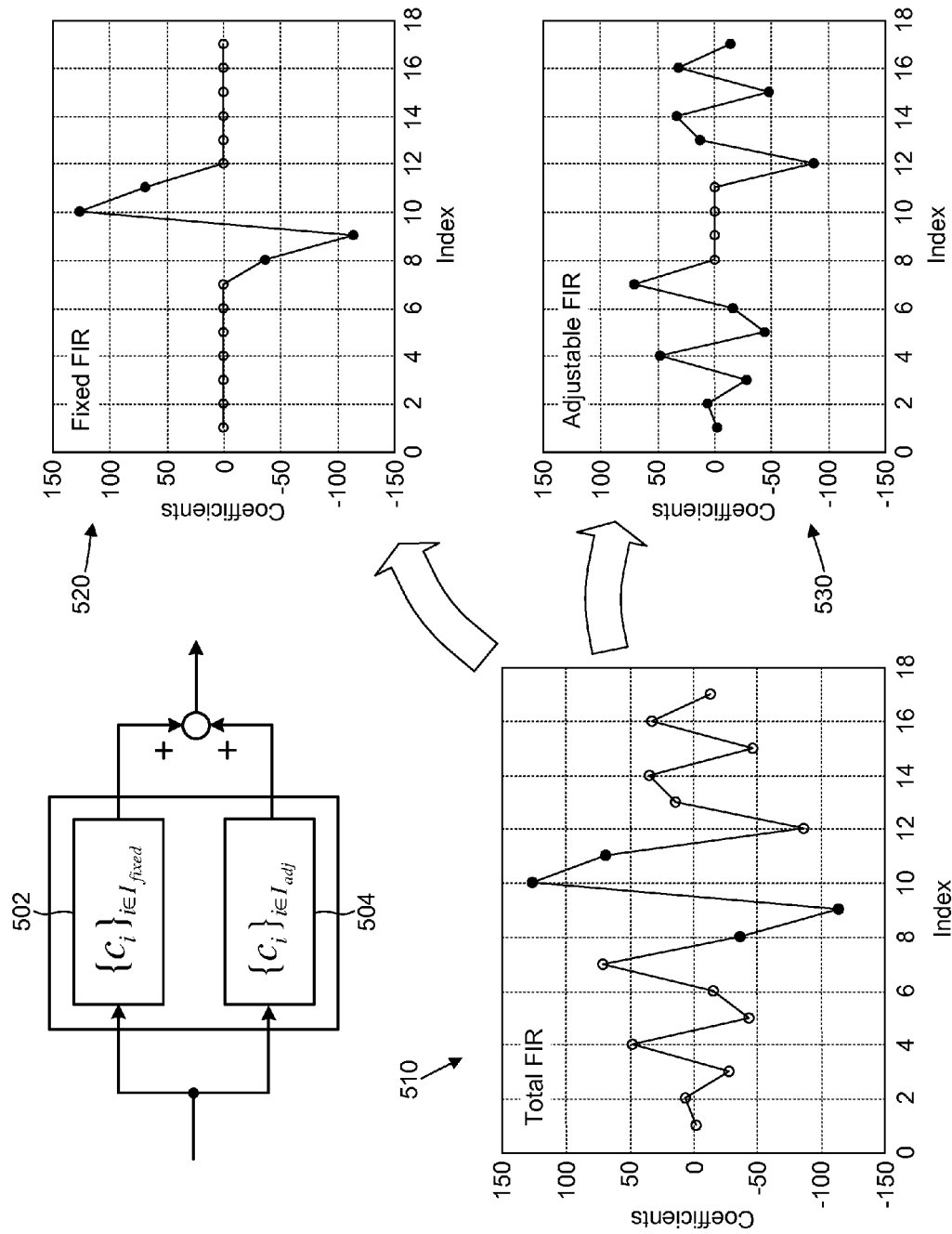
FIG. 5 is a diagram showing how a programmable FIR equalizer may be separated into fixed and adjustable parts for use in the method of FIG. 4.
Figure 6B:
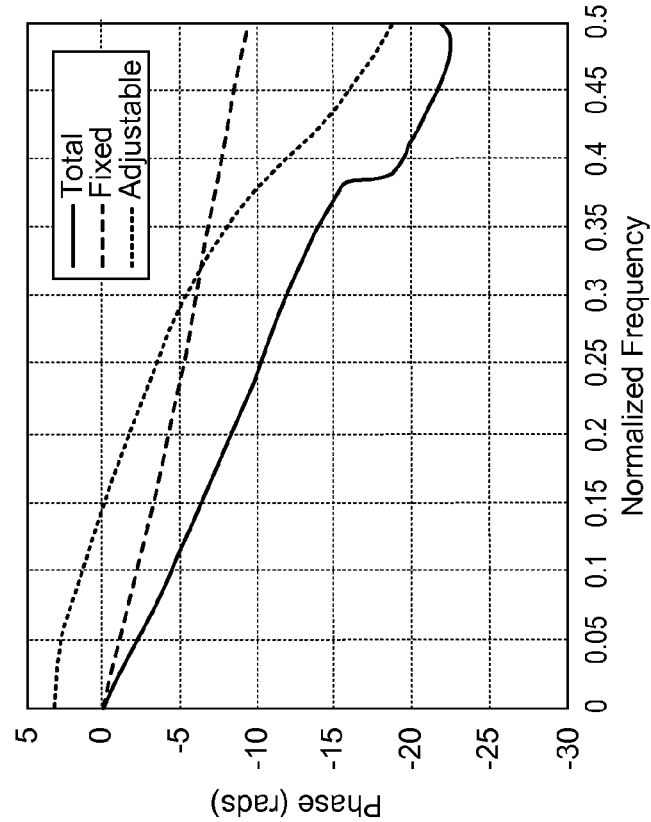
Figure 6A:
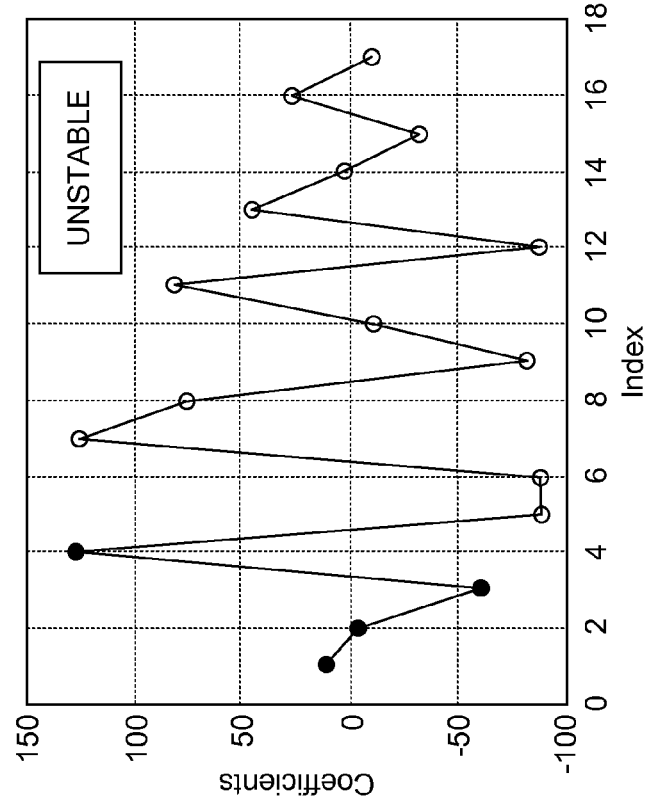

Referring to FIG. 5, as previously mentioned, the method 400 separates 408 the FIR equalizer 108 into "fixed" and "adjustable" parts. What occurs with this separation is illustrated in FIG. 5. To illustrate the separation, assume the method 400 has performed 402 an initial calibration procedure to determine initial values for a FIR equalizer's tap coefficients. Assume that the initial values for each of the seventeen tap coefficients are illustrated in chart 510. Further assume that tap coefficients eight through eleven are a set of four tap coefficients that can potentially be fixed, as further illustrated in chart 510. A FIR equalizer with all its tap coefficients set to their initial values is referred to hereinafter as a "total" FIR equalizer.

As further shown in FIG. 5, the "total" FIR equalizer may be separated into "fixed" and "adjustable" parts 520, 530. For the purposes of this description, a "fixed" FIR equalizer 520 refers to a FIR equalizer having the current set of tap coefficients currently considered by the method 400 set to their initial values while all other tap coefficients are set to zero. Similarly, an "adjustable" FIR equalizer 520 may refer to a FIR equalizer having the current set of tap coefficients currently considered by the method 400 set to zero while all other tap coefficients are set to their initial values. The "fixed" FIR equalizer 520 and the "adjustable" FIR equalizer 530 together form the "total" FIR equalizer 510. The significance of the "total" FIR equalizer 510 and the "fixed" FIR equalizer 520 illustrated in FIG. 5 will become apparent in the example illustrated in FIGS. 6A through 15B.

Referring to FIGS. 6A through 15B, an example is provided to show a real-world implementation of the method 400 of FIG. 4. The example is provided for a FIR equalizer 108 having seventeen tap coefficients, or fourteen sets of four consecutive tap coefficients. As shown, in FIG. 6A, the method 400 initially selects a first set of tap coefficients (i.e., tap coefficients 1-4), each having the illustrated initial values. The method 400 then calculates the "total" FIR equalizer and the "fixed" FIR equalizer in the manner previously described. The method 400 then calculates the phase spectra for the "total" FIR equalizer and the "fixed" FIR equalizer respectively. In general, the phase spectra of the "total" FIR equalizer represents the phase of the transfer function of the "total" FIR equalizer, whereas the phase spectra of the "fixed" FIR equalizer represents the phase of the transfer function of the "fixed" FIR equalizer. The phase spectra for the "total" FIR equalizer and the "fixed" FIR equalizer are shown in FIG. 6B.

Once the phase spectra are calculated, the method 400 calculates 410 the phase-difference energy between the phase spectra of the "total" FIR equalizer and the "fixed" FIR equalizer. The magnitude of the phase-difference energy is directly related to the area between the "total" FIR equalizer phase spectra and the "fixed" FIR equalizer phase spectra. The larger the area, the larger the phase-difference energy. Similarly, the smaller the area, the smaller the phase-difference energy. Stated in another way, the more closely the phase spectra align, the smaller the area and the lower the phase-difference energy.

Figure 7A:
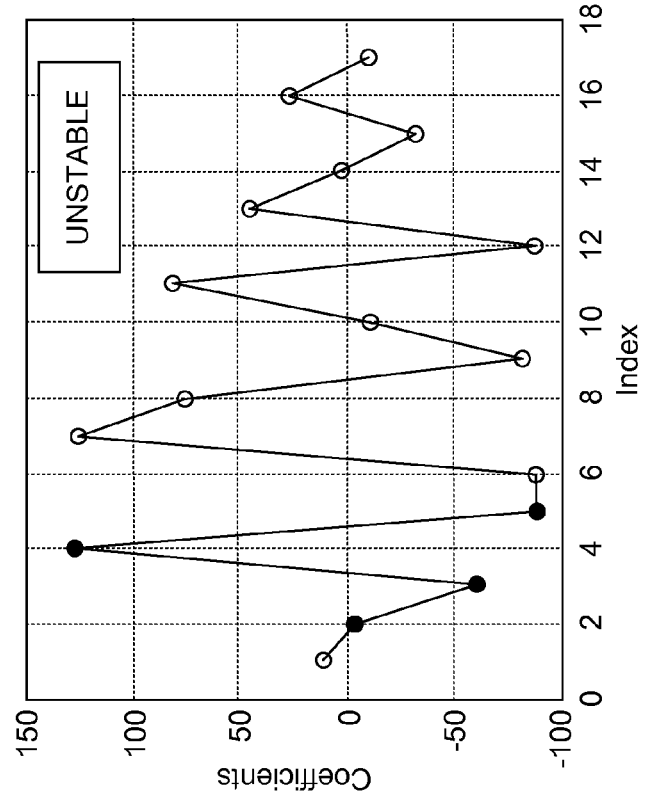
Figure 7B:
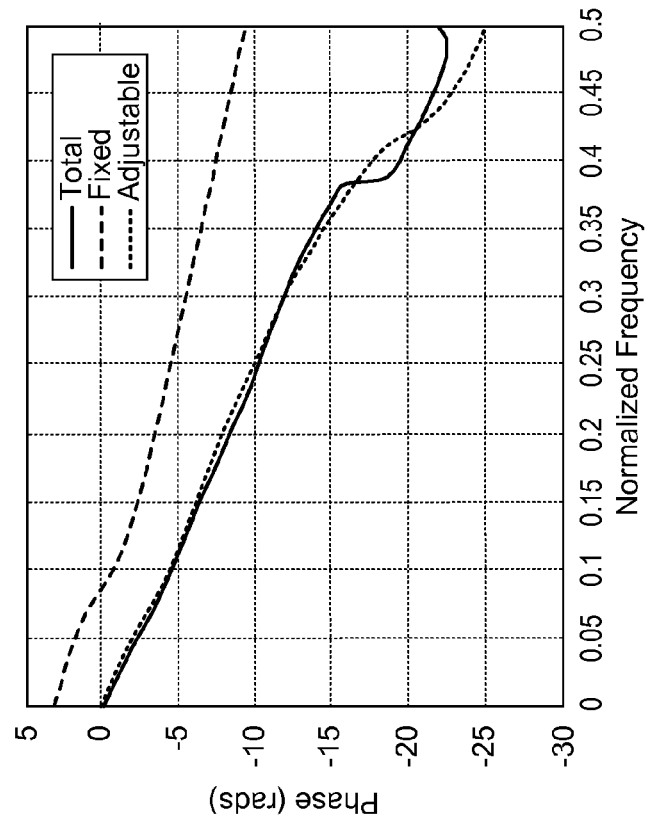
Figure 9B:
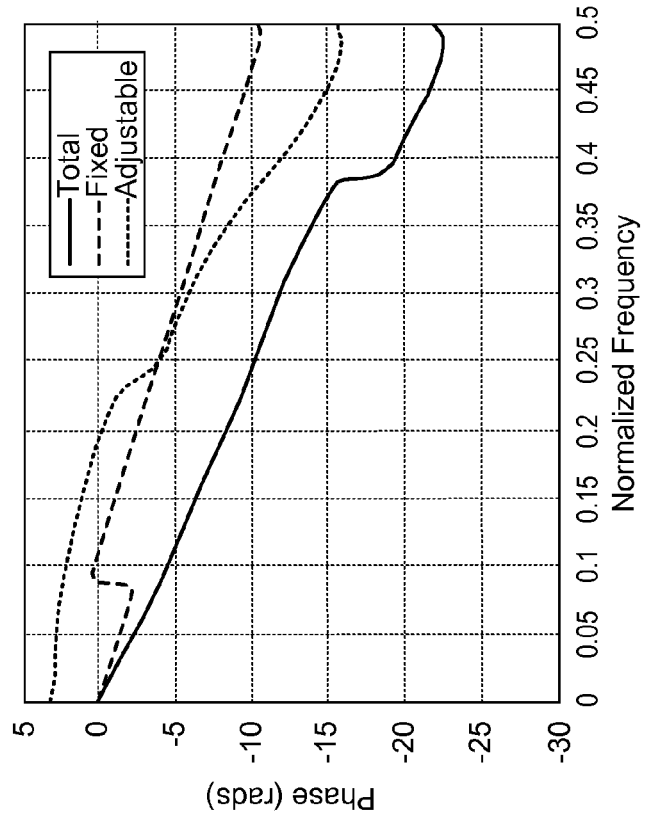
Figure 9A:
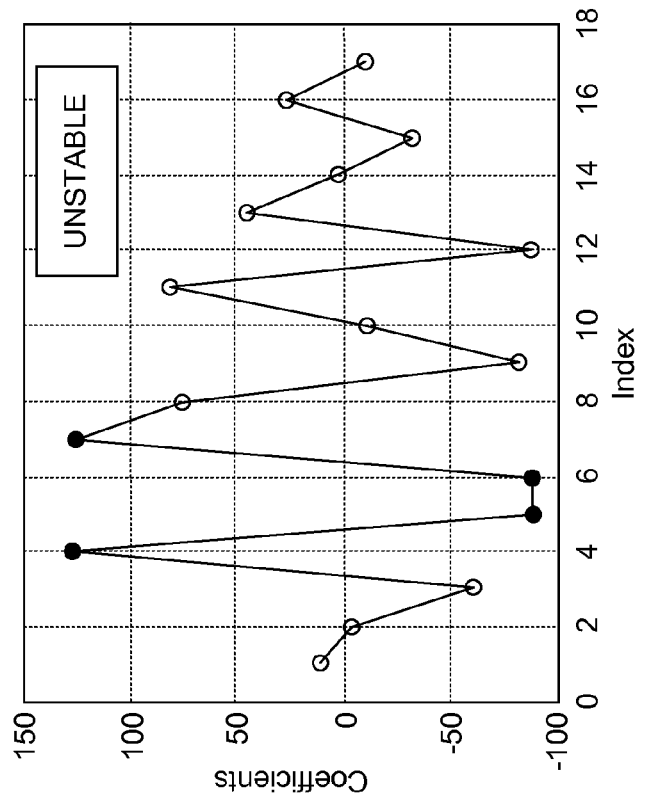
Figure 10B:
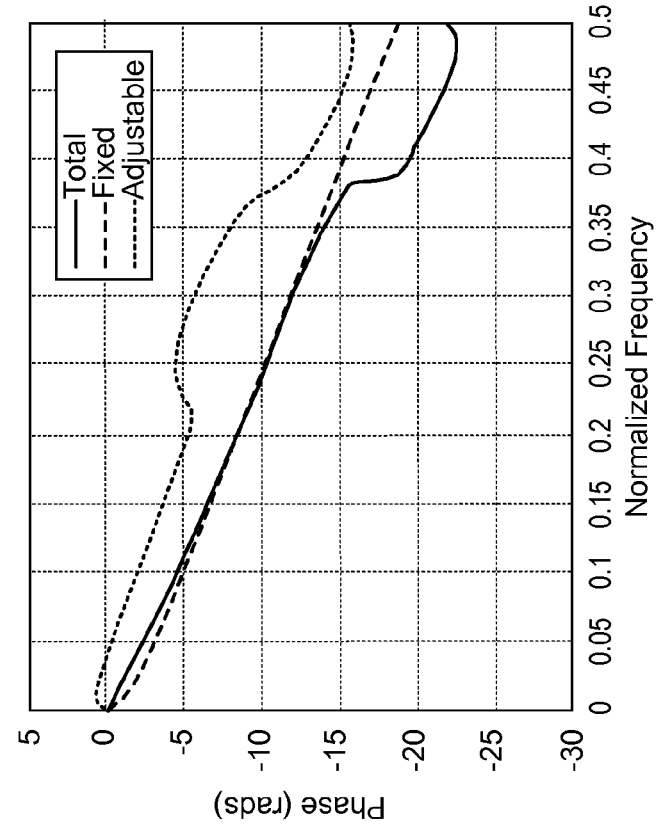
Figure 10A:
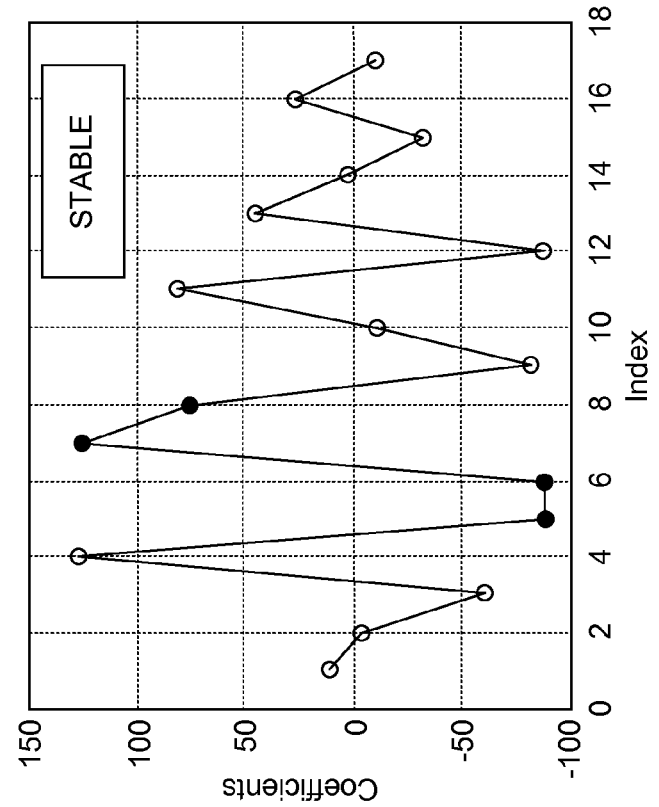
Figure 11B:
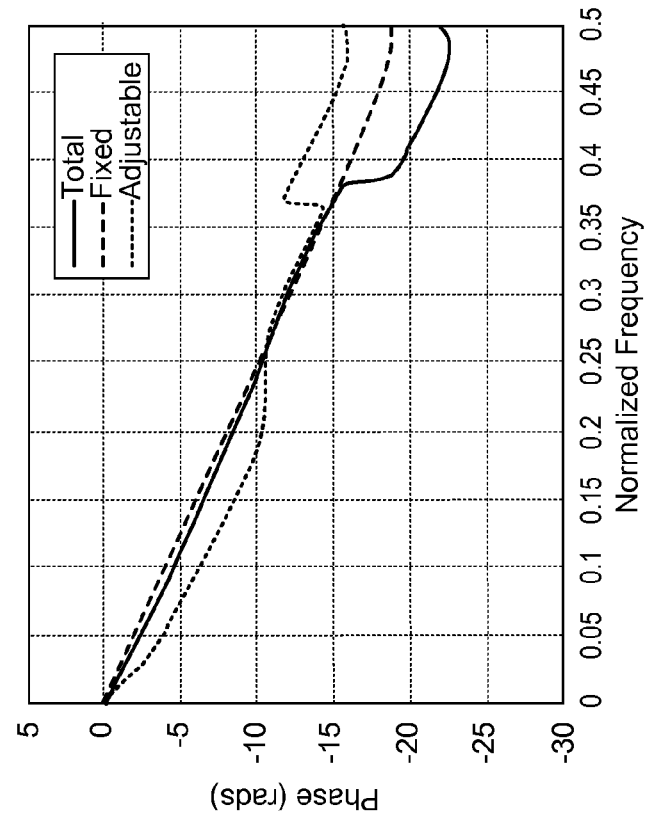
Figure 11A:
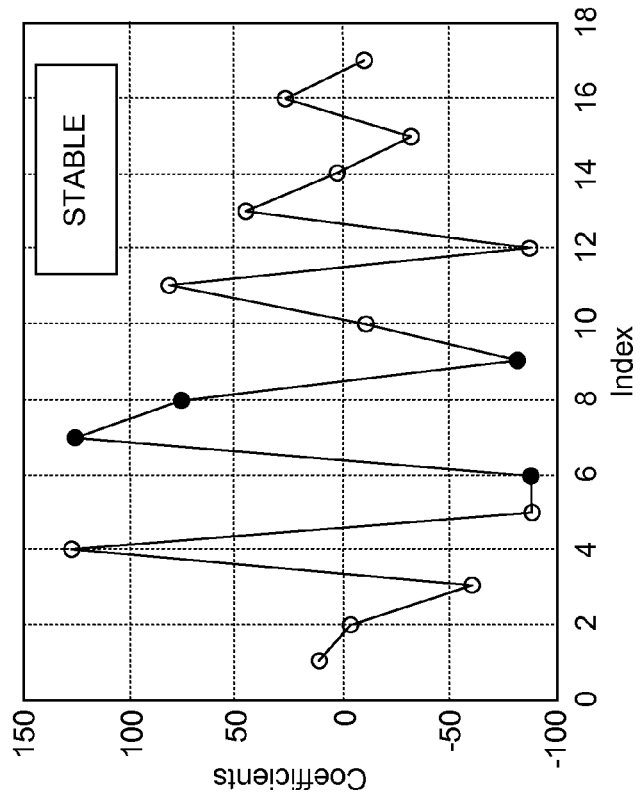
Figure 12B:
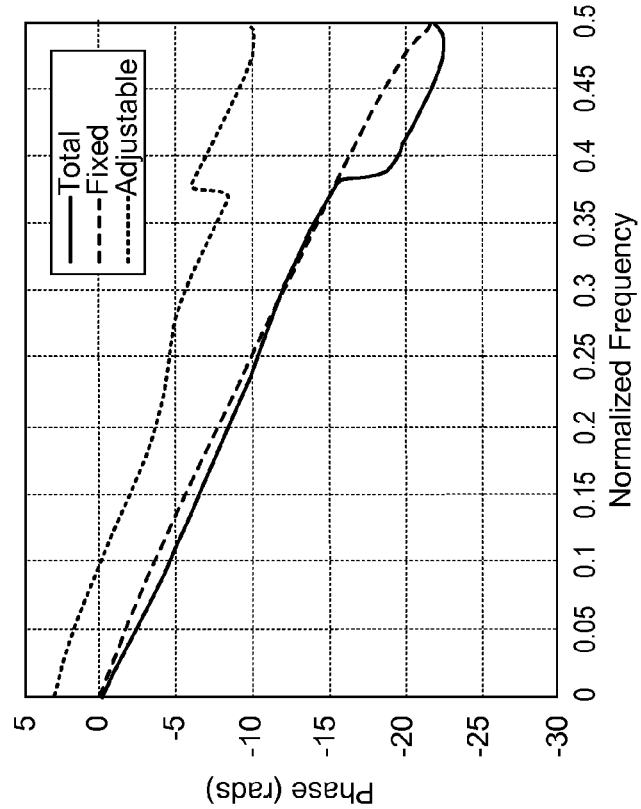
Figure 12A:
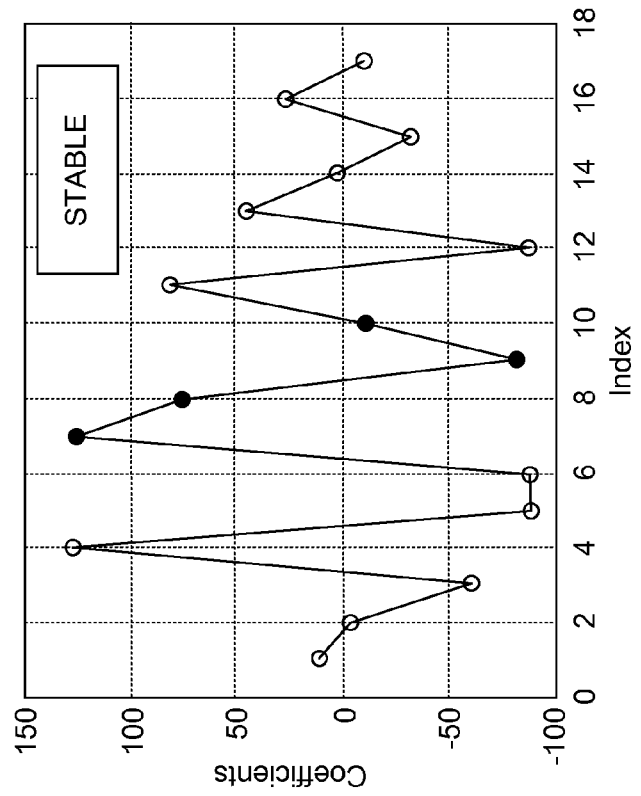
Figure 13B:
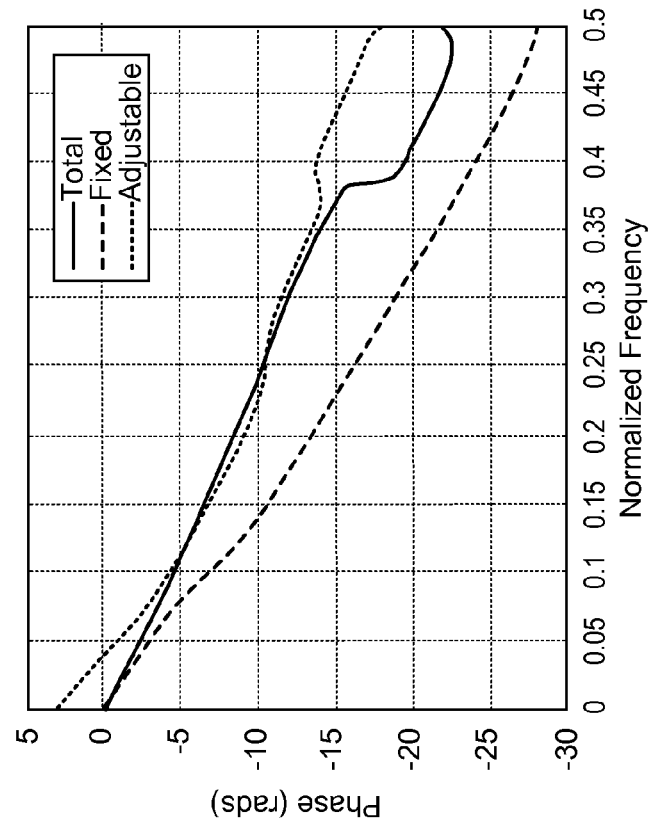
Figure 13A:
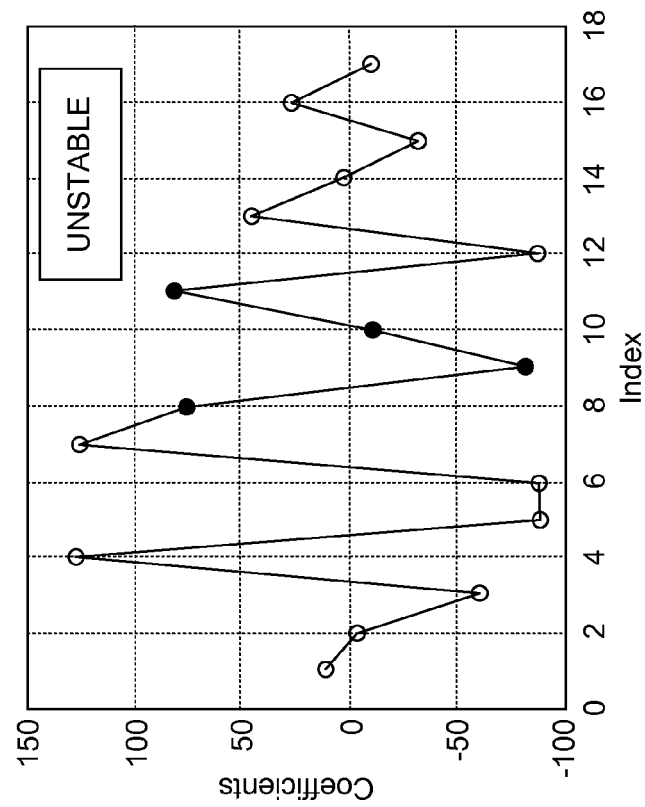
Figure 14B:
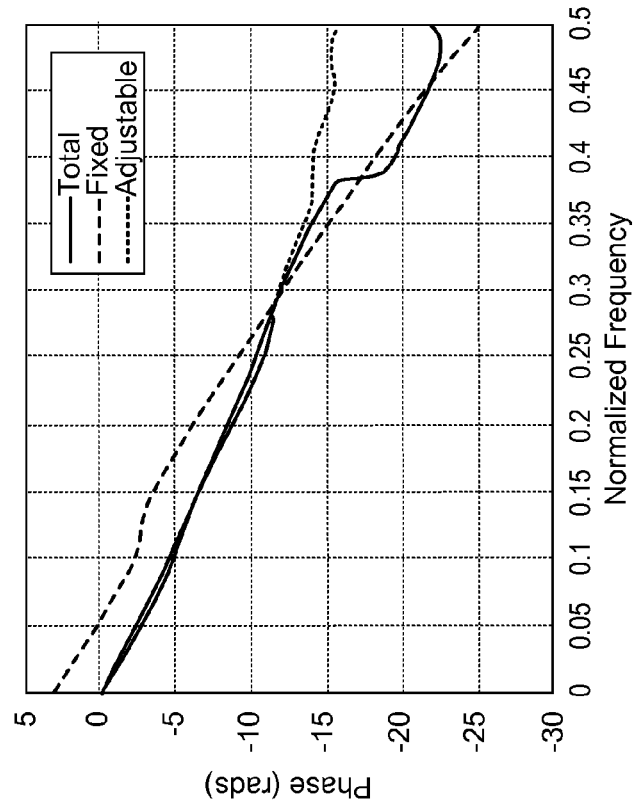
Figure 14A:
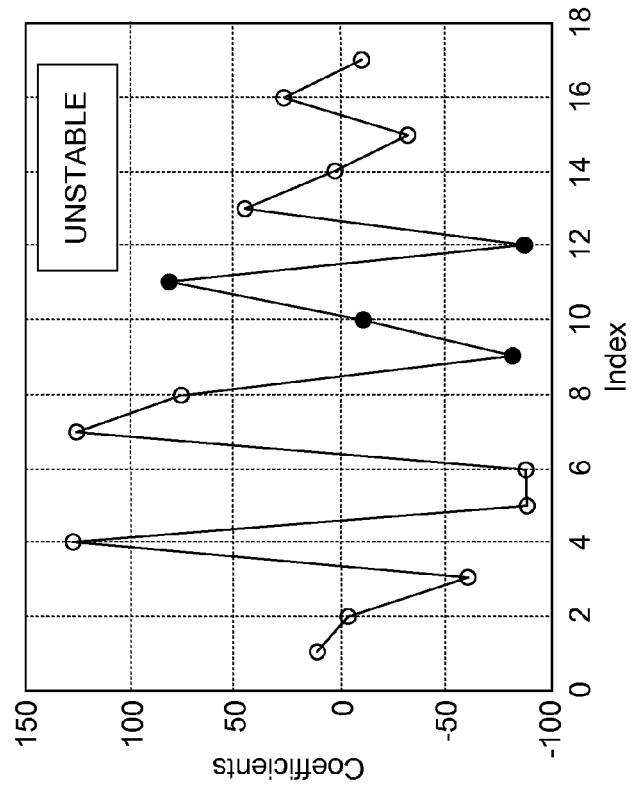
Figure 15B:
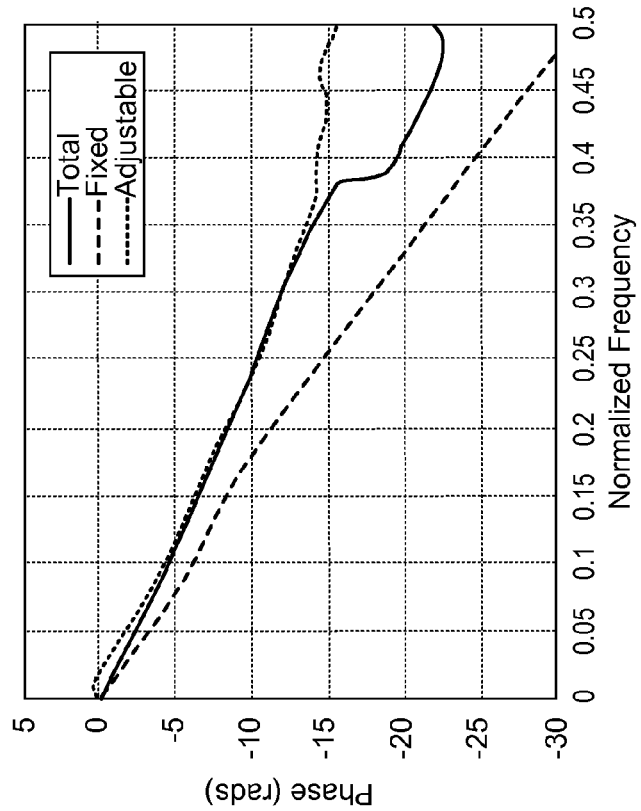
Figure 15A:
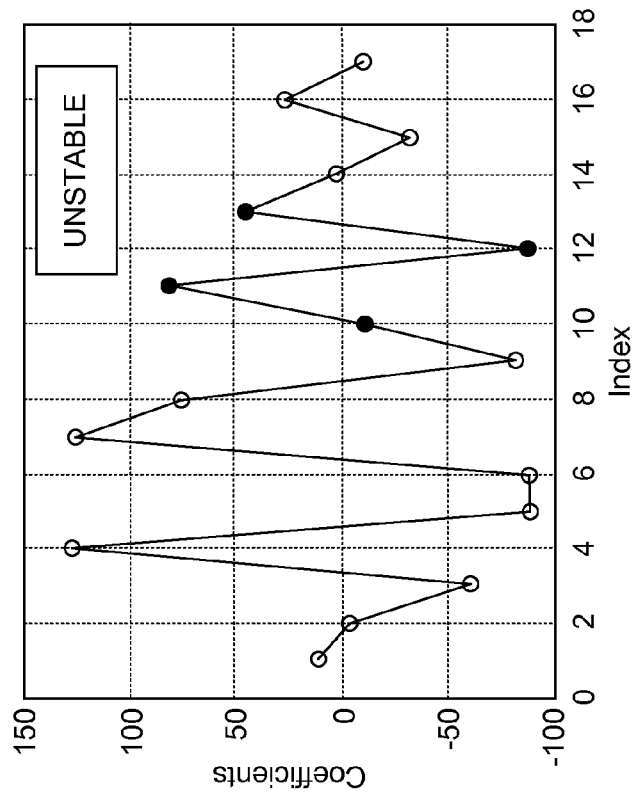

This process is repeated for each of the sets of four consecutive tap coefficients of the FIR equalizer 108. For example, FIG. 7A shows the next four tap coefficients (i.e., tap coefficients 2-5) and their initial values. FIG. 7B shows the phase spectra for the "total" FIR equalizer and the "fixed" FIR equalizer respectively based on the set of tap coefficients illustrated in FIG. 7A. Similarly, FIG. 8A shows the next four tap coefficients (i.e., tap coefficients 3-6) and their initial values. FIG. 8B shows the phase spectra for the "total" FIR equalizer and the "fixed" FIR equalizer respectively based on the set of tap coefficients illustrated in FIG. 8A. FIGS. 9A through 15B show the initial values and phase spectra for the next seven sets of tap coefficients. Data related to the last four sets of tap coefficients has been omitted since it is unessential to understanding the invention.

Figure 16:
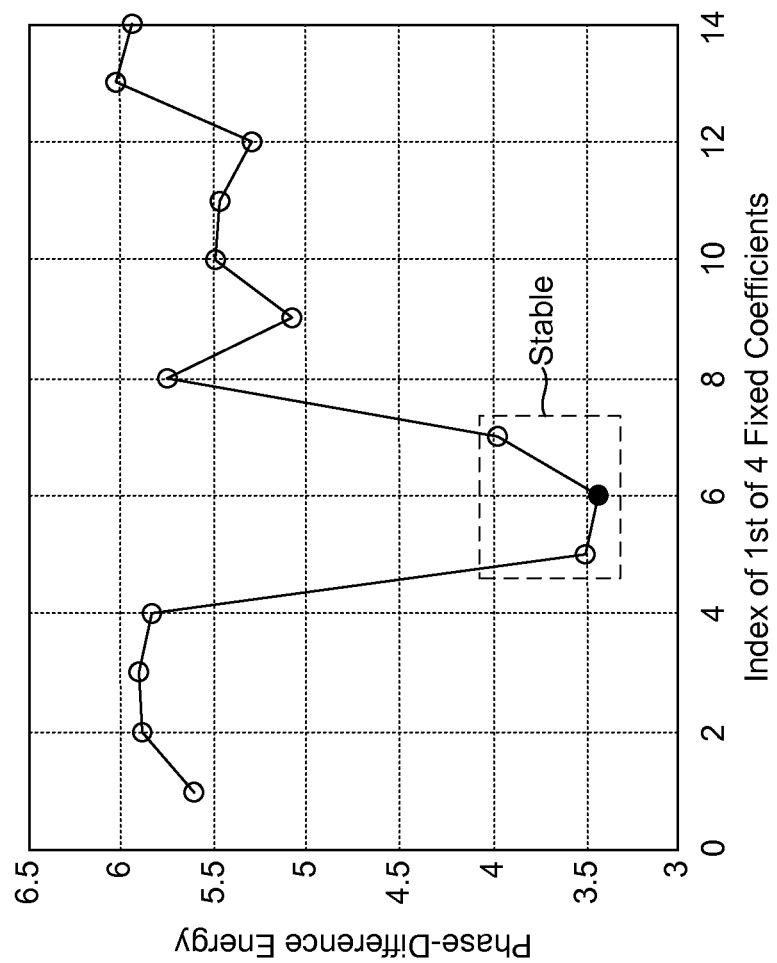
FIG. 16 is a diagram showing the phase-difference energy associated with each of the sets of tap coefficients described in FIGS. 6A through 15B.

Referring to FIG. 16, continuing the example of FIGS. 6A through 15B, the phase-difference energies associated with each of the fourteen sets of four tap coefficients are illustrated. As shown, the sixth set of four tap coefficients had the lowest phase-difference energy. The phase spectra associated with the sixth set of four tap coefficients is illustrated in FIG. 11B. As can be observed in FIG. 11B, the area between the phase spectra of the "total" FIR equalizer and the phase spectra of the "fixed" FIR equalizer is very small, thereby indicating a relatively small phase-difference energy. In practice, fixing the sixth set of tap coefficients produced a FIR equalizer 108 that was stable and converged to an optimal configuration, thereby verifying the effectiveness of the recited method 400 in selecting which tap coefficients to fix.

Interestingly, fixing the fifth and seventh sets of tap coefficients also produced a FIR equalizer 108 that was stable and converged to an optimal configuration. As can be observed from FIG. 16, the phase-difference energy associated with the fifth and seventh sets of tap coefficients were the second and third lowest, respectively, thereby confirming the correlation between low phase-difference energy and FIR equalizer stability. To the contrary, fixing any of the other sets of tap coefficients produced a FIR equalizer that was unstable.

Although the example described in association with FIGS. 6A through 16 used a FIR equalizer 108 with seventeen tap coefficients and four fixed taps, the described method 400 is not limited to this configuration. The method 400 may be used with FIR equalizers 108 having any number of tap coefficients as well as any number of fixed taps. The instant inventors have found the described method 400 to be significantly more reliable than many current techniques for determining which tap coefficients to fix.

The flowcharts and/or block diagrams in the Figures illustrate the architecture, functionality, and operation of possible implementations of systems, methods, and computer-usable storage media according to various embodiments of the present invention. In this regard, each block in the flowcharts and/or block diagrams may represent a module, segment, or portion of code, which comprises one or more executable instructions for implementing the specified logical function(s). It should also be noted that, in some alternative implementations, the functions noted in a block may occur in a different order than that illustrated in the Figures. For example, two blocks shown in succession may, in fact, be implemented in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for selecting which tap coefficients of a programmable finite-impulse-response (FIR) equalizer to fix, the method comprising:
    performing an initial calibration to determine an initial value for each tap coefficient of a FIR equalizer;
    determining a "total" FIR equalizer where the tap coefficients are set to their initial values;
    determining a plurality of sets of tap coefficients that may potentially be fixed in the FIR equalizer;
    for each set of tap coefficients that may potentially be fixed, determining a "fixed" FIR equalizer where the tap coefficients in the set are set to their initial values and other tap coefficients are set to zero;
    for each set of tap coefficients that may potentially be fixed, determining a phase-difference energy between the "total" FIR equalizer and the "fixed" FIR equalizer; and
    fixing the set of tap coefficients associated with the lowest phase-difference energy.

2. The method of claim 1, wherein the tap coefficients in each set are tap coefficients from adjacent FIR taps.

3. The method of claim 1, wherein each set of tap coefficients includes an equal number of tap coefficients.

4. The method of claim 3, wherein the number is variable.

5. The method of claim 1, wherein fixing the set of tap coefficients comprises allowing the remaining tap coefficients to vary.

6. The method of claim 1, wherein determining the phase-difference energy between the "total" FIR equalizer and the "fixed" FIR equalizer comprises initially determining the phase spectra for both the "total" FIR equalizer and the "fixed" FIR equalizer.

7. The method of claim 6, wherein determining the phase-difference energy comprises determining the energy difference between the phase spectra.

8. An apparatus for selecting which tap coefficients of a programmable finite-impulse-response (FIR) equalizer to fix, the apparatus comprising:
    a tape drive configured to perform the following:
        perform an initial calibration to determine an initial value for each tap coefficient of a FIR equalizer;
        determine a "total" FIR equalizer where the tap coefficients are set to their initial values;

determine a plurality of sets of tap coefficients that may potentially be fixed in the FIR equalizer;

for each set of tap coefficients that may potentially be fixed, determining a "fixed" FIR equalizer where the tap coefficients in the set are set to their initial values and other tap coefficients are set to zero;

for each set of tap coefficients that may potentially be fixed, determining a phase-difference energy between the "total" FIR equalizer and the "fixed" FIR equalizer; and fixing the set of tap coefficients associated with the lowest phase-difference energy.

9. The apparatus of claim 8, wherein the tap coefficients in each set are tap coefficients from adjacent FIR taps.

10. The apparatus of claim 8, wherein each set of tap coefficients includes an equal number of tap coefficients.

11. The apparatus of claim 10, wherein the number is variable.

12. The apparatus of claim 8, wherein fixing the set of tap coefficients comprises allowing the remaining tap coefficients to vary.

13. The apparatus of claim 8, wherein determining the phase-difference energy between the "total" FIR equalizer and the "fixed" FIR equalizer comprises initially determining the phase spectra for both the "total" FIR equalizer and the "fixed" FIR equalizer.

14. The apparatus of claim 13, wherein determining the phase-difference energy comprises determining the energy difference between the phase spectra.

15. A computer program product for selecting which tap coefficients of a programmable finite-impulse-response (FIR) equalizer to fix, the computer program product comprising a computer-readable storage medium having computer-usable program code embodied therein, the computer-usable program code comprising:

computer-usable program code to perform an initial calibration to determine an initial value for each tap coefficient of a FIR equalizer;

computer-usable program code to determine a "total" FIR equalizer where the tap coefficients are set to their initial values;

computer-usable program code to determine a plurality of sets of tap coefficients that may potentially be fixed in the FIR equalizer;

computer-usable program code to, for each set of tap coefficients that may potentially be fixed, determine a "fixed" FIR equalizer where the tap coefficients in the set are set to their initial values and other tap coefficients are set to zero;

computer-usable program code to, for each set of tap coefficients that may potentially be fixed, determine a phase-difference energy between the "total" FIR equalizer and the "fixed" FIR equalizer; and computer-usable program code to fix the set of tap coefficients associated with the lowest phase-difference energy.

16. The computer program product of claim 15, wherein the tap coefficients in each set are tap coefficients from adjacent FIR taps.

17. The computer program product of claim 15, wherein each set of tap coefficients includes an equal number of tap coefficients.

18. The computer program product of claim 17, wherein the number is variable.

19. The computer program product of claim 15, wherein fixing the set of tap coefficients comprises allowing the remaining tap coefficients to vary.

20. The computer program product of claim 15, wherein determining the phase-difference energy between the "total" FIR equalizer and the "fixed" FIR equalizer comprises initially determining the phase spectra for both the "total" FIR equalizer and the "fixed" FIR equalizer, and determining the energy difference between the phase spectra.

* * * * *